United States Patent Office 2,832,723
Patented Apr. 29, 1958

2,832,723

REFINING PETROLEUM BY CONTACTING FIRST WITH OXYGEN-CONTAINING GAS AND THEN WITH AN EPOXIDE REAGENT

James L. Jezl, Swarthmore, Pa., assignor to Sun Oil Company, Philadelphia, Pa., a corporation of New Jersey No Drawing. Application April 26, 1954
Serial No. 425,745

7 Claims. (Cl. 196—41)

This invention relates to petroleum refining and more particularly to the removal of unstable constituents from petroleum materials to produce a color-stable material.

Various petroleum materials such as crude petroleum, and fractions and conversion products thereof contain substantial amounts of materials which impart objectionable properties to the petroleum material, e. g. objectionable color, odor, etc. or which are susceptible to reactions producing materials having such properties. Various means have been employed heretofore to attempt to remove these objectionable materials from petroleum or to convert them into nonobjectionable form, but complete enough removal or conversion is difficult to obtain, since some types of objectionable materials do not respond to treatments which are effective to remove or convert other types.

According to the present invention, a process is provided which is effective to remove or convert types of objectionable materials which have previously been difficult or impossible to remove or convert satisfactorily. In the process of the present invention, a petroleum material is partially oxidized to convert objectionable materials, which may be of hydrocarbon or nonhydrocarbon nature, into partial oxidation products, and the petroleum material is then contacted with an epoxide to react with the partial oxidation products to convert the latter into products which are unobjectionable if left in the petroleum material or which may conveniently be removed from the petroleum material.

Any suitable petroleum material may be employed as charge material for the process of the invention. Thus crude oil, reduced crude, kerosene, spirits, gas oil, furnace oil, diesel fuel, jet fuel, lubricating oil, etc. may advantageously be treated; straight run or cracked fractions may be treated.

The partial oxidation step should be performed in a manner such that unstable constituents of the charge material are largely converted to partial oxidation products, whereas oxidation of stable constituents of the charge should be minimized. Generally, the constituents which are readily oxidized are those which it is most desirable to remove; those constituents which are more refractory to oxidation are less objectionable and may be left unconverted in the process of the invention.

Preferably the oxidation is terminated before the saponification number of the oxidized charge material has increased to 5 mg. of KOH per gram. In fact it is not essential that there be any appreciable increase in acid number or saponification number, since the oxidation of the small amount of objectionable materials present in the charge may not produce any such increase. The essential feature is that the charge material be intimately contacted with an oxidizing agent for a substantial period of time, e. g. at least a minute; generally, the partial oxidation step will not require more than 5 hours.

Any suitable oxidizing agent may be employed, e. g. air, oxygen, ozone, ozonized air, oxygen-containing flue gas, hydrogen peroxide, chlorates, perborates, permanganates, perchromates, manganese dioxide, etc.

Any suitable oxidation temperature can be employed. With some oxidizing agents, ordinary room temperature without heating is satisfactory. Generally, increasing the oxidation temperature increases the rate of oxidation. Preferred temperatures, when using air as oxidizing agent, are those in the range from 200° F. to 500° F.; temperatures above 500° F. should generally be avoided lest undesirable reactions of hydrocarbon constituents occur.

One highly suitable manner of conducting the oxidation step is to bubble air through the charge in liquid phase, with or without an oxidation catalyst, while maintaining the system under atmospheric or higher pressure, preferably not greater than 100 p. s. i. g. The oxidation is preferably conducted in liquid phase, since controlled oxidation is more readily obtained in such operation.

The epoxidation step is performed by intimately contacting the partially oxidized charge material with an epoxide, or alkylene oxide, reagent. Suitable reagents are those compounds containing a three-membered heterocyclic ring containing one oxygen atom and two carbon atoms. Preferred epoxide reagents for use according to the invention are those having the formula:

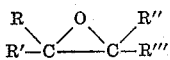

where R is selected from the group consisting of hydrogen, hydrocarbon radicals having 1 to 5 carbon atoms, alkoxyalkyl or other hydrocarbyloxyalkyl radicals having not more than 5 carbon atoms, halogen radicals, and

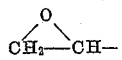

radicals, and where R', R'', and R''' are each selected from the group consisting of hydrogen, hydrocarbon radicals having 1 to 5 carbon atoms, and halogen radicals. Examples of the preferred epoxides are ethylene oxide and propylene oxide, which are particularly preferred, styrene oxide, phenoxypropylene oxide, butoxypropylene oxide, butadiene oxide, epichlorohydrin, etc.

The epoxidation step can be performed at room temperature or at higher temperatures, and with the petroleum material in liquid phase. The temperature should be less than that at which substantial thermal breakdown of the petroleum material occurs; generally temperatures not substantially greater than 600° F., and more preferably not substantially greater than 500° F., are employed. Any suitable catalyst may be employed if desired, e. g. an alkaline catalyst such as an alkali metal or alkaline earth metal oxide, hydroxide, or carbonate, etc. At temperatures less than 200° F., a catalyst should generally be used for satisfactory reaction. Preferred temperatures for use according to the invention are those in the range from 200° F. to 600° F., more preferably in the range from 300° F. to 500° F.

The amount of epoxide employed is generally a minor amount and preferably in the range from 0.01 to 10 parts by weight per 100 parts of charge, more preferably 0.1 to 5 parts per 100. If an alkaline catalyst is used, the amount of the latter is generally a minor amount and preferably in the range from 0.5 to 25 parts per 100 of charge, more preferably 1 to 10 parts per 100. When aqueous sodium hydroxide is used, the concentration of the aqueous solution is preferably in the range from 5 to 25%, though higher or lower concentrations can be used. Spent caustic soda or other alkaline material which has been previously used to contact other petroleum material can be employed as alkaline catalyst.

In the process of the invention, a variety of reactions may take place. Among these reactions may be mentioned, for example, the oxidation of polynuclear aromatic hydrocarbons, such as anthracene or derivatives thereof, to form anthrols or derivatives thereof, and reaction of such anthrols or derivatives with an epoxide to form a reaction product which may be left in the oil without adversely affecting the color thereof, whereas the original hydrocarbon, if left in the oil, would tend to form anthraquinone or derivatives thereof upon aging or use of the oil, and the formation of such materials would tend to discolor the oil. Other reactions include the oxidation of indoles or derivatives thereof to form an oxygenated product and reaction of the latter with an epoxide to form a reaction product which may be left in the oil without adversely affecting the color thereof, whereas the original indole, if left in the oil, would tend to form color bodies upon aging or use of the oil. Other reactions may occur in the process of the invention to convert compounds, which would form color bodies on aging or use, into compounds which are stable on aging or use, or which may readily be removed from the oil.

As an example of the manner in which the process of the invention may be conducted, reference may be made to treatment of a petroleum distillate lubricating oil having S. U. viscosity at 100° F. of about 100 seconds. Such lubricating oil may, as obtained from the distillation tower, have satisfactory color. However, the color stability of the oil may be unsatisfactory so that the oil discolors badly upon heating to elevated temperatures, e. g. about 250° F. for substantial periods of time, e. g. 12 hours, in the presence of oxygen. Treatment of such oil by the process of the invention, however, very substantially improves the color stability of the oil. Such treatment may consist, for example, of heating the oil to 350° F. and bubbling air or oxygen therethrough for 1 to 5 hours. Under these conditions, no catalyst promoting oxidation of paraffinic or naphthenic hydrocarbons being present, the increase in acid number and saponification number is insignificant. However, various constituents which are unstable to oxidation are converted to oxygenated products. The oil containing these oxygenated products is then contacted with ethylene oxide. For example, 1 part of ethylene oxide may be added to 100 parts of oil and the latter distilled to obtain a highly stable distillate, the reaction products of ethylene oxide and the oxygenated products remaining, at least in part, in the residue. Alternatively, a reduced crude may be partially oxidized as indicated above, and ethylene oxide may be added to the product obtained before distilling the latter to obtain lubricating oil fractions.

The invention claimed is:

1. Process for refining petroleum materials which comprises: dispersing an oxidizing agent within petroleum material; contacting said petroleum material and said oxidizing agent under partial oxidation conditions, thereby to convert unstable constituents of said petroleum material to partial oxidation products thereof; and contacting the partially oxidized petroleum material with an epoxide reagent, thereby to react said partial oxidation products with said epoxide.

2. Process according to claim 1 wherein said epoxide has the formula:

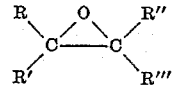

where R is selected from the group consisting of hydrogen, hydrocarbon radicals having 1 to 5 carbon atoms, halogen radicals, hydrocarbyloxyalkyl radicals having not more than 5 carbon atoms, and

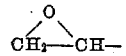

radicals, and where R', R'', and R''' are each selected from the group consisting of hydrogen, hydrocarbon radicals having 1 to 5 carbon atoms, and halogen radicals.

3. Process for refining petroleum materials which comprises: intimately contacting petroleum material in liquid phase with a free-oxygen containing gas at a temperature within the approximate range 200° F. to 500° F., thereby to convert unstable constituents of said petroleum material to partial oxidation products thereof; and contacting the resulting partially oxidized petroleum material with ethylene oxide, thereby to react said oxidation products with said ethylene oxide.

4. Process according to claim 1 wherein the contacting with an epoxide reagent is performed in the presence of an alkaline catalyst.

5. Process according to claim 4 wherein said alkaline catalyst is caustic soda.

6. Process according to claim 1 wherein a free-oxygen containing gas is bubbled through said body of petroleum material.

7. Process according to claim 1 wherein said partially oxidizing is performed in the absence of an epoxide.

References Cited in the file of this patent

UNITED STATES PATENTS

| | | |
|---|---|---|
| 2,495,851 | Lien et al. | Jan. 30, 1950 |
| 2,530,561 | Arnold et al. | Nov. 21, 1950 |
| 2,575,989 | Arundale et al. | Nov. 20, 1951 |
| 2,684,943 | Baker | July 27, 1954 |